United States Patent [19]
Beers et al.

[11] Patent Number: 6,101,561
[45] Date of Patent: Aug. 8, 2000

[54] SYSTEM FOR PROVIDING AN INCREASE IN DIGITAL DATA TRANSMISSION RATE OVER A PARALLEL BUS BY CONVERTING BINARY FORMAT VOLTAGES TO ENCODED ANALOG FORMAT CURRENTS

[75] Inventors: Gregory Edward Beers, Austin; Richard Francis Frankeny, Cedar Park; Mithkal Moh'd Smadi, Round Rock, all of Tex.

[73] Assignee: International Business Machines Corporation, Armonk, N.Y.

[21] Appl. No.: 09/019,592

[22] Filed: Feb. 6, 1998

[51] Int. Cl.[7] .............................. G06F 13/40; H03M 5/16
[52] U.S. Cl. ............................ 710/66; 327/103; 341/57; 341/126; 341/141; 341/155; 710/69
[58] Field of Search .................................. 710/66, 69, 71, 710/70, 101; 327/103; 341/57, 126, 141, 155

[56] References Cited

U.S. PATENT DOCUMENTS

| | | | |
|---|---|---|---|
| H1342 | 8/1994 | Whitesell | 710/100 |
| 3,680,051 | 7/1972 | Blessin et al. | 375/357 |
| 3,980,993 | 9/1976 | Bredart et al. | 713/501 |
| 4,245,305 | 1/1981 | Gechele et al. | 710/25 |
| 4,468,737 | 8/1984 | Bowen | 710/58 |
| 4,486,833 | 12/1984 | Daudelin | 710/58 |
| 4,524,417 | 6/1985 | Kimoto | 710/58 |
| 4,663,620 | 5/1987 | Paul et al. | 340/825.5 |
| 4,736,293 | 4/1988 | Patrick | 711/128 |
| 4,859,877 | 8/1989 | Cooperman et al. | 326/30 |
| 4,890,010 | 12/1989 | Neudeck et al. | 327/108 |
| 5,017,817 | 5/1991 | Yamakawa | 326/59 |
| 5,095,231 | 3/1992 | Sartori et al. | 326/30 |
| 5,105,295 | 4/1992 | O'Byrne | 359/191 |
| 5,107,230 | 4/1992 | King | 326/86 |
| 5,111,080 | 5/1992 | Mizukami et al. | 326/30 |
| 5,134,311 | 7/1992 | Biber et al. | 327/108 |
| 5,165,046 | 11/1992 | Hesson | 327/111 |
| 5,206,544 | 4/1993 | Chen et al. | 326/30 |
| 5,283,761 | 2/1994 | Gilingham | 365/189.07 |
| 5,382,841 | 1/1995 | Feldbaumer | 326/30 |
| 5,398,327 | 3/1995 | Yoshida | 710/66 |
| 5,404,461 | 4/1995 | Olnowich et al. | 710/131 |
| 5,414,583 | 5/1995 | Jordan | 361/91 |
| 5,418,475 | 5/1995 | Otaka | 326/30 |
| 5,418,911 | 5/1995 | Zilka et al. | 395/325 |
| 5,438,282 | 8/1995 | Kuo | 326/86 |
| 5,463,331 | 10/1995 | Kuo | 326/86 |
| 5,466,975 | 11/1995 | Wratten | 307/100 |
| 5,469,432 | 11/1995 | Gat | 370/389 |
| 5,471,632 | 11/1995 | Gavin et al. | 710/104 |
| 5,479,636 | 12/1995 | Vanka et al. | 711/133 |

(List continued on next page.)

*Primary Examiner*—Thomas C. Lee
*Assistant Examiner*—Ilwoo Park
*Attorney, Agent, or Firm*—Casimer K. Salys; Andrew J. Dillon

[57] ABSTRACT

A method and circuit, for use with a parallel data bus of defined width, which provide a parallel data transmission and reception rate which is greater than the defined width of the parallel data bus. With respect to improving transmission, provided is a width-reduction circuit element, having at least two inputs through which are received a first set of parallel digital data signals and having one or more outputs through which are transmitted a second set of parallel digital data signals where the second set is both smaller than the first set and representative of the information contained within the first set. The one or more outputs interface with a parallel connector which is sufficient to form an operable connection with the parallel data bus of defined width. With respect to improving reception, provided is a width-expansion circuit element having one or more inputs through which are received a second set of parallel digital data signals and having at least two outputs through which are transmitted a first set of parallel digital data signals where the first set is both larger than the second set and representative of information encoded within the second set. The one or more inputs interface with a parallel connector sufficient to form an operable connection with the parallel data bus of defined width.

20 Claims, 11 Drawing Sheets

U.S. PATENT DOCUMENTS

| | | | |
|---|---|---|---|
| 5,481,207 | 1/1996 | Crafts | 326/86 |
| 5,487,155 | 1/1996 | Drewry et al. | 710/131 |
| 5,490,253 | 2/1996 | Laha et al. | 710/124 |
| 5,504,927 | 4/1996 | Okamoto et al. | 710/58 |
| 5,507,001 | 4/1996 | Nishizawa | 710/5 |
| 5,526,497 | 6/1996 | Zilka et al. | 710/130 |
| 5,530,813 | 6/1996 | Paulsen et al. | 710/132 |
| 5,533,201 | 7/1996 | Benton et al. | 710/100 |
| 5,898,886 | 4/1999 | Hewitt | 710/70 |

SYSTEM FOR PROVIDING AN INCREASE IN DIGITAL DATA TRANSMISSION RATE OVER A PARALLEL BUS BY CONVERTING BINARY FORMAT VOLTAGES TO ENCODED ANALOG FORMAT CURRENTS

CROSS-REFERENCE TO RELATED APPLICATIONS

The present application is related to U.S. Patent Application having Ser. No. 08/823,820, now U.S. Pat. No. 5,913,075, filed on Mar. 25, 1997. The subject matter thereof is incorporated herein by reference. The application is assigned to the assignee of the present application.

BACKGROUND OF THE INVENTION

1. Field of the Invention

The present invention relates, in general, to a method and system for use with integrated circuits transmitting and receiving digital data over a parallel data bus of defined width. Specifically, the present invention relates to a method and system, for use with integrated circuits transmitting and receiving digital data over a parallel data bus of defined width, and which provide a significant increase in the integrated circuits' parallel digital data transmission rate without increasing the width of the parallel data bus of defined width.

2. Description of Related Art

An integrated circuit is a device consisting of a number of connected circuit elements, such as transistors and resistors and functional combinations thereof, fabricated on a single chip of silicon crystal or other semiconductor material. In integrated circuit fabrication technology, an ever-increasing number of integrated circuit devices are being built into chips. This growing number of devices requires a correspondingly greater number of input/output (I/O) connections to and from the chip.

After fabrication, the integrated circuits are generally utilized to perform a function in some overall system (for example, Application Specific Integrated Circuits are now being utilized to perform many specialized features in network server computers). In order to function with other circuit components in such an overall system, the integrated circuits must communicate with them. Such communication is typically achieved via conducting paths laid out on what is known as a printed circuit board.

A printed circuit board is typically a flat board made of non-conducting material, such as plastic or fiberglass, on which chips (including, but not limited to, integrated circuits) and other electronic components are mounted, usually in pre-drilled holes designed to hold them. The component holes are connected electrically by predefined conductive metal pathways that are printed on the surface of the board. The metal leads protruding from the electronic components are soldered to the conductive metal pathways to form a connection. More recently, surface mount technology has been utilized to affix components to printed circuit boards without requiring pins and through holes.

Each set of conductive metal pathways, connected to the metal leads protruding from the electronic components, is typically referred to as a parallel data bus. A parallel data bus is characterized by the number of bits it can transfer at a single time, equivalent to the number of parallel conducting paths (which can be thought of as wires) wired to the metal leads of an integrated circuit. The number of these parallel conducting paths is typically referred to as the width of the bus.

The miniaturization of integrated circuits has made it possible to pack more and more data processing power into a small volume. The increased data processing power has made it necessary to provide more metal leads (I/O connections for the integrated circuit) for each integrated circuit. However, the small volume of the integrated circuit has also resulted in such metal leads being tightly spaced. Consequently, on a printed circuit board utilizing modern integrated circuits, the I/O connections of the integrated circuits are physically very close. Accordingly, the conductive paths, at least where they connect with individual I/O connections, are also in very close proximity to each other.

It can be seen that merely from the standpoint of spatial dimensions, there has to be an upper limit of the amount of conductors that can be placed in parallel. However, long before that spatial limit is reached, electromagnetic interference (e.g., coupling effects) between such parallel conductors starts to impinge upon the effectiveness of data transmission, since at some point such interference effects make the placing of more conductors in parallel impracticable.

While a limit of number of conductors practicably connected in parallel is rapidly approaching, the processing power of integrated circuits continues to increase while the volume of the integrated circuits continues to shrink. Each advance in integrated circuits typically requires an increase in bus width to transmit the processed data on and off chip; that is, data bus requirements of integrated circuits have gone from 16 to 32 to 64 to 128 line buses, with some of the more recent advances requiring 256 lines or higher, with no end to bus requirements in sight. However, as noted, the physical constraints of data bus width are becoming a problem, and the trends indicate that the data bus itself will become a data processing bottleneck in the very near future, by which it is meant that the integrated circuits can process, present, and receive parallel data faster than available parallel data buses can transfer such data into and out of the integrated circuits.

It is therefore apparent that a need exists for a method and system which provide an increase in parallel digital data transmission rate over a parallel bus of defined width, but without a concomitant increase of new lines or conductors to the parallel bus of defined width.

SUMMARY OF THE INVENTION

It is therefore one object of the present invention to provide a method and system for use with an integrated circuits transmitting and receiving digital data over a parallel data bus of defined width.

It is therefore another object of the present invention to provide a method and system, for use with integrated circuits transmitting and receiving digital data over a parallel data bus of defined width, and which provide a significant increase in the integrated circuits parallel digital data transmission rate without requiring an increase of the width of the parallel data bus of defined width.

The objects of the invention are achieved by a method and circuit, for use with a parallel data bus of defined width, which provide a parallel data transmission and reception rate which is greater than the defined width of the parallel data bus. With respect to improving transmission, provided is a width-reduction circuit element, having at least two inputs through which are received a first set of parallel digital data signals and having one or more outputs through which are transmitted a second set of parallel digital data signals where the second set is both smaller than the first set and representative of the information contained within the first set. One or more one outputs of the width-reduction circuit are operably connected to a parallel connector which is sufficient to form an operable connection with the parallel data bus of defined width. Further with respect to improving transmission, a first set of parallel digital data signals is received by the width-reduction circuit. The width-reduction circuit produces a second set of parallel digital data signals where the second set is both smaller than the first set and is representative of the information contained within the first set, the second set is then transmitted via the parallel digital data bus of defined width. With respect to improving reception, provided is a width-expansion circuit element having one or more inputs through which are received a second set of parallel digital data signals and having at least two outputs through which are transmitted a first set of parallel digital data signals where the first set is both larger than the second set and representative of information encoded within the second set. One or more inputs of the width-expansion circuit are operably connected to a parallel connector sufficient to form an operable connection with the parallel data bus of defined width. Further with respect to parallel reception, the width-expansion circuit receives, via the parallel digital data bus of defined width, a second set of parallel digital data signals. The width-expansion circuit produces a first set of parallel digital data signals where the first set is both larger than the second set and is representative of the information encoded within the second set, and the first set is then transmitted.

The above, as well as additional objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF THE INVENTION

Figure 1A:
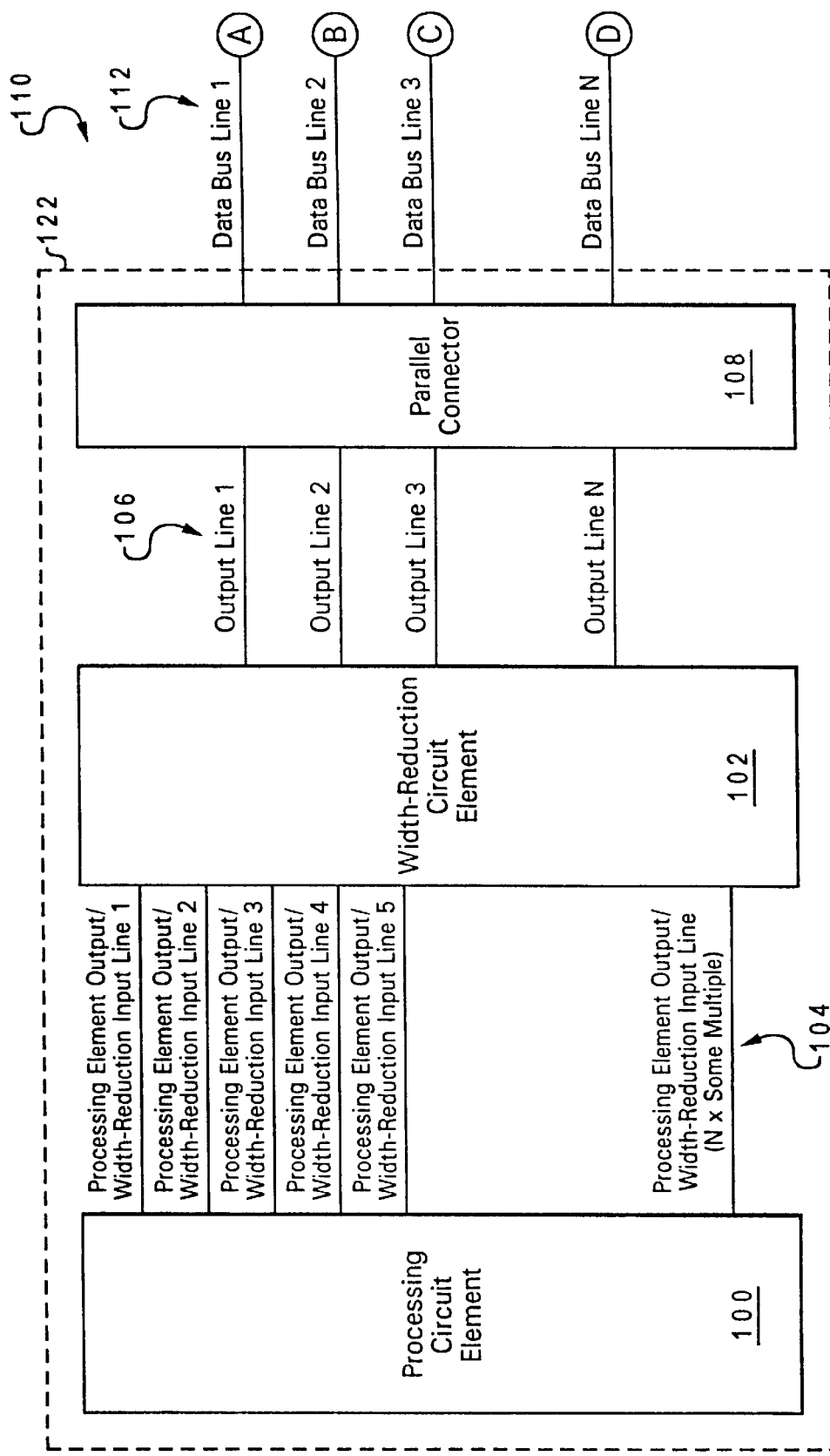
FIG. 1A depicts a perspective view of one embodiment of the present invention.
Figure 1B:
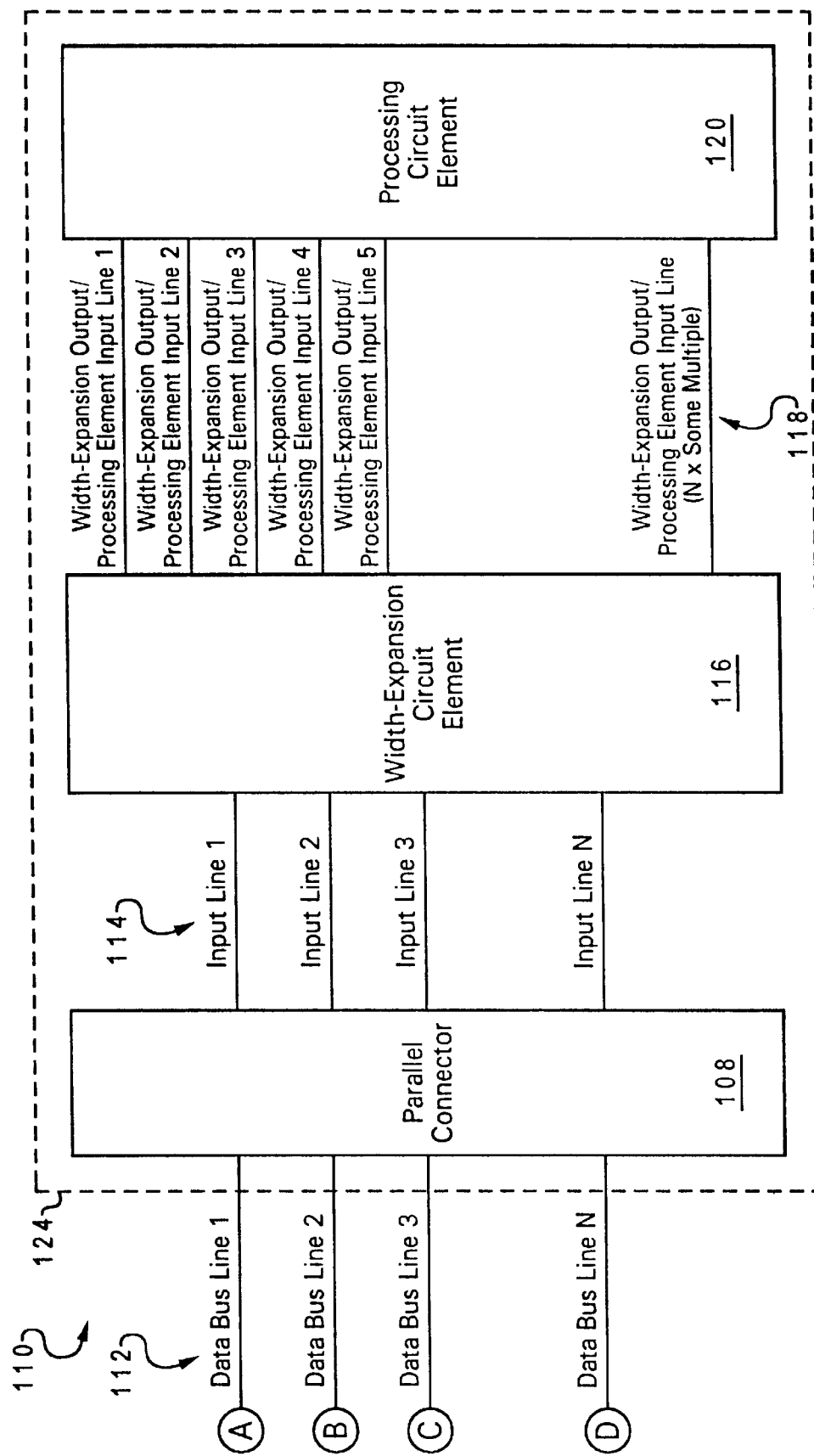
FIG. 1B depicts an alternate perspective view of one embodiment of the present invention.

With reference to the figures, and in particular with reference now to FIGS. 1A and 1B, there is depicted a perspective view of one embodiment of the present invention. Shown in FIG. 1A is processor circuit element 100. Processing element 100 feeds its output to width-reduction circuit element 102 via processing element output/width-reduction input lines 104. Depicted in FIG. 1A is that width-reduction circuit element 102 accepts as input "some multiple times N" (where "some multiple" is some non-zero, non-negative integer and "N" is also some non-zero, non-negative integer) processing element output/width-reduction input lines 104.

Width-reduction circuit element 102 encodes the "some multiple times N" processing element output/width-reduction input lines 104 into output lines 106. Depicted in FIG. 1A is that width-reduction circuit element 102 encodes the information contained within the "some multiple times N" processing element output/width-reduction input lines 104 into "N" number of output lines 106. Thereafter, N number of output lines 106 articulate with parallel connector 108 which is adapted to easily connect with parallel data bus 110, which, as can be seen in FIG. 1A is composed of N data bus lines 112.

As can be seen from the foregoing, width-reduction circuit element 102 makes it possible for processing circuit element 100, which has "some multiple times N" processing element output/width-reduction input lines 104, to transmit the digital information on those "some multiple times N" lines utilizing parallel data bus 110, which is composed of "N" data bus lines 112, without requiring that parallel data bus 110 be expanded to a width sufficient to match "some multiple times N" processing element output/width-reduction input lines 104, which would be required but for this embodiment of the present invention.

Shown in FIG. 1B is parallel data bus 110, which is composed of N data bus lines 112, and which connects with parallel connector 108. Parallel connector 108 articulates with "N" number of input lines 114. N number of input lines 114 feed into width-expansion circuit element 116. Width-expansion circuit 116 decodes N number of input lines 114 into a "some multiple times N" (where "some multiple" is some non-zero, a non-negative integer and N is also sound non-zero, non-negative integer) width-expansion output/processing element input lines 118 (it is to be understood that although the number of width-expansion output/processing element input lines 118 has been shown as the same as the number of processing element output/width-reduction input lines 104, such similarity in number is not necessarily required, and that the number of such lines can in fact the different).

Width-expansion output/processing element input lines 118 feed into processing circuit element 120.

As can be seen from the foregoing, width-expansion circuit element 116 makes it possible for parallel data bus 110, which is composed of N data bus lines 112, to transmit digital information on those N lines, such that the transmission is equivalent to transmitting "some multiple times N" width-expansion output/processing element input lines 118 over parallel data bus lines 112, but without requiring that parallel data bus 110 be expanded to a width sufficient to match the "some multiple times N" width-expansion output/processing element input lines 118.

Shown in FIGS. 1A and 1B are that width-reduction circuit element 102 and width-expansion circuit element 116 function as stand-alone circuit elements, such as when either or both are utilized to supplement pre-existing integrated circuits. Alternatively, shown via dashed lines in FIGS. 1A and 1B are that width-reduction circuit element 102 and width-expansion circuit element 116 can be themselves incorporated into integrated circuit packages 122 and 124.

Figure 2A:
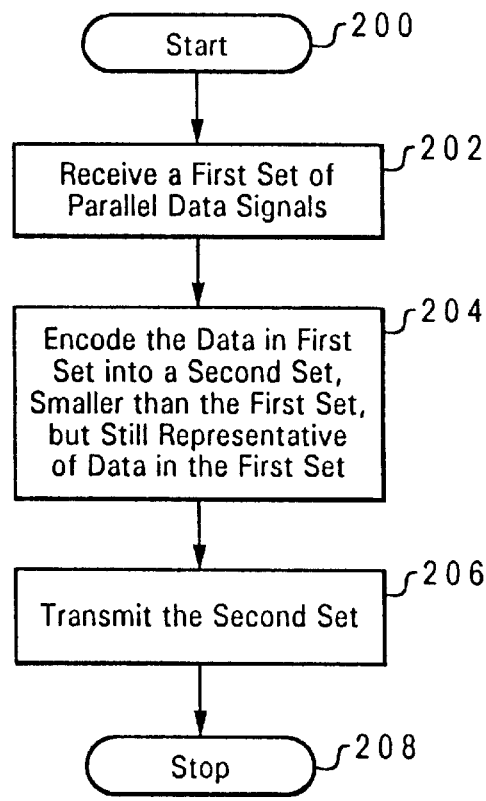
FIG. 2A illustrates a high-level logic flow chart depicting one method utilized by one embodiment of the present invention.
Figure 2B:
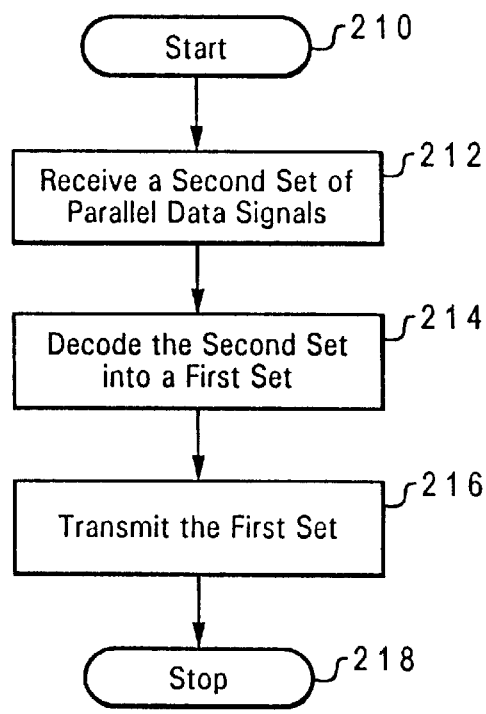
FIG. 2B illustrates a high-level logic flow chart depicting an alternate method utilized by one embodiment of the present invention.

FIGS. 2A and 2B are high-level logic flow charts depicting two methods utilized by one embodiment of the present invention. Referring now to FIG. 2A, method step 200 illustrates the start of the process. Method step 202 shows the reception of a first set of parallel data signals by width-reduction circuit element 102. Method step 204 depicts the encoding, by width-reduction circuit element 102, of the data in the received first set into a second set, smaller than the received first set, but where the second set (which could be as small as one signal) is still representative of the data in the received first set. Thereafter, the process proceeds to method step 206 which illustrates the transmission of the second set by width-reduction circuit element 102.

Subsequently, the process proceeds to method step 208 and stops.

Referring now to FIG. 2B, method step 210 illustrates the start of a process. Method step 212 shows the reception of a second set (which could be as small as one signal) of parallel data signals by width-expansion circuit element 116.

Method step 214 depicts the decoding, by width-expansion circuit element 116, of the data in the received second said into a first set, larger than the received second set, but where the first set is representative of data encoded in the received second set. Thereafter, the process proceeds to method step 216 by width-expansion circuit element 116. Subsequently, the process proceeds to method step 218 and stops.

Figure 3:
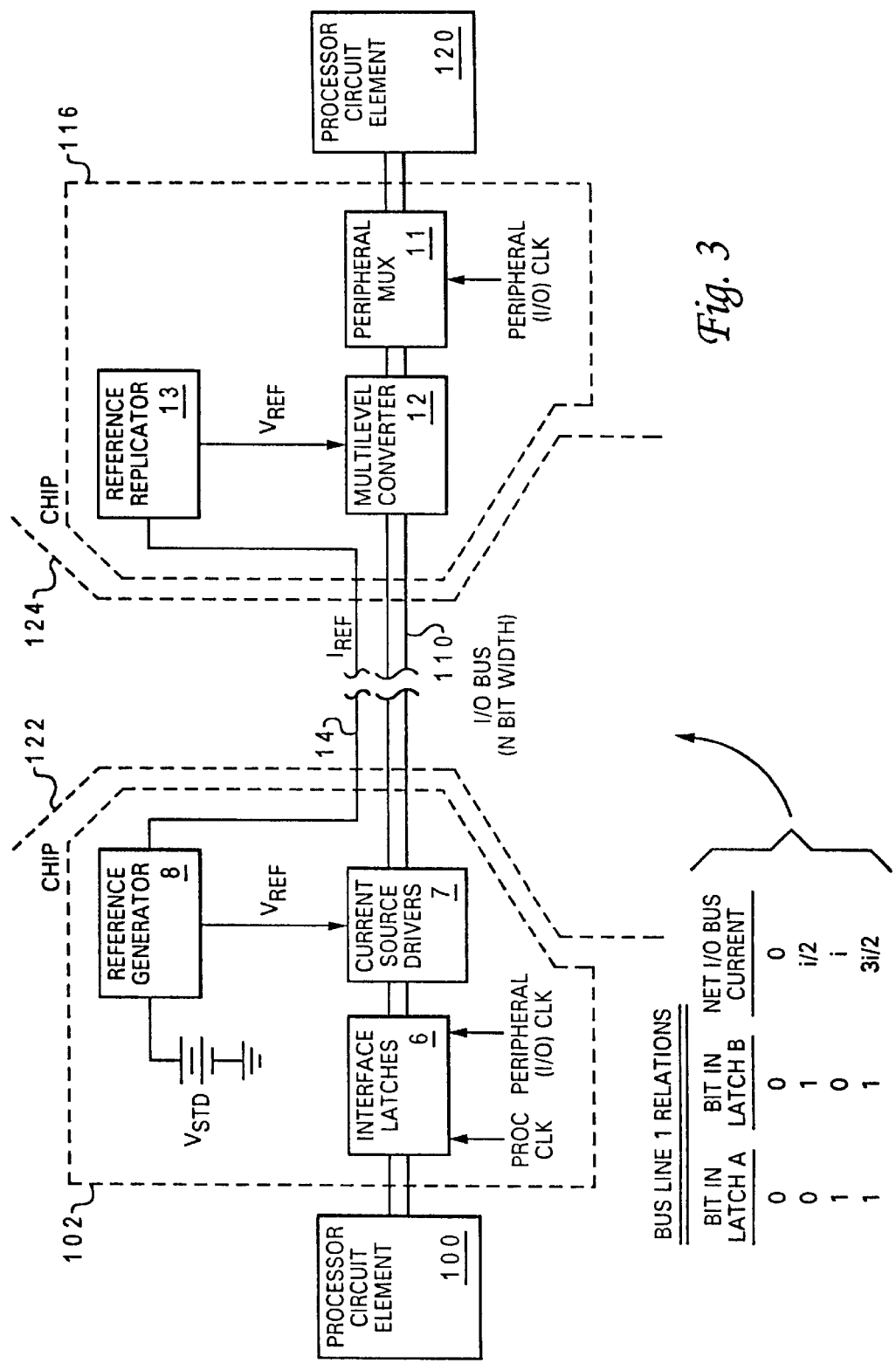
FIG. 3 schematically illustrates by functional blocks a more detailed diagram of the embodiment of the present invention as was set forth in FIG. 1.

With reference now to FIG. 3, it can be seen that FIG. 3 schematically illustrates by functional blocks a more detailed diagram of the embodiment of the present invention as was set forth in FIG. 1. This more detailed diagram will be set forth in the context of one directional transmission over I/O parallel data bus 110 phone. For ease of understanding, FIG. 3 will show the detail of the embodiment where "N" is equated with "one", "some multiple" is equated with "two", and hence "N times some multiple" is equated with the number "two"; however, those skilled in the art will appreciate that "N" can be virtually any positive integer number, and that "N times some multiple" can be any positive integer greater than one, and that the circuit disclosed can be modified to accommodate such configurations by standard engineering techniques well-known to those within the art.

As embodied in FIG. 3, processor circuit element 100 is a common integrated circuit chip, generally 122, with width-reduction circuit element 102 embodied as interface latches 6, current source drivers 7, and reference generator 8. Operations performed on integrated circuit 122 are generally digital in format.

An analogous chip, generally at 124, also generally operates in a digital format, and for purposes of the embodiment in FIG. 3 encompasses processing circuit element 120, and with width-expansion circuit element 116 embodied as peripheral multiplexer 11, multilevel converter 12, and reference replicator 13. As will become apparent from a further description of the functions performed by the elements in the embodiment, the locations of reference generator 8 and reference replicator 13 can be interchanged with relative ease while retaining the functionality of the invention. Similarly, though the invention depicted in FIG. 3 relates to an embodiment in which data is transferred solely from the processor circuit element 100 to processing circuit element 120, duplication of interface latches 6, current source drivers 7, multilevel converter 12 and peripheral multiplexer 11 would allow data transmission in both directions over I/O parallel data bus 110.

The table in FIG. 3 sets forth signal values for an implementation in which current levels generated by current source drivers 7 and decoded by multilevel converter 12 can be defined to represent multiple digital format data bits, the multiple data bits accumulated from processor circuit element 100, and delivered to processing circuit element 120. The table exemplifies how current levels on the single line of the bus represent multiple bits of latched digital data, where the current sources provide net current levels of either 0, I/2, I, or 3I/2 on a bus line to represent for successive processor generated bits A and B the combinations 00, 01, 10, or 11, respectively.

One aspect of the invention relates to the fact that the integrated circuit devices on a common integrated circuit chip, whether that be integrated circuit 122 or integrated circuit 124, share similar fabrication process variations and are subject to the same thermal conditions. As such, the present invention allows for current mode transmission of signals over a bus interconnecting integrated circuit chips while retaining the "N times some multiple" delete to "N" and "N" to "N times some multiple" conversion accuracy at both the generating and receiving ends. Differentiation between the multiple levels is accomplished through the use of reference generator 8 and a reference replicator 13, the two being related by common reference current $I_{REF}$ on line 14. However, it is envisioned that as fabrication accuracy increases, such common reference current may eventually not be needed.

Figure 4:
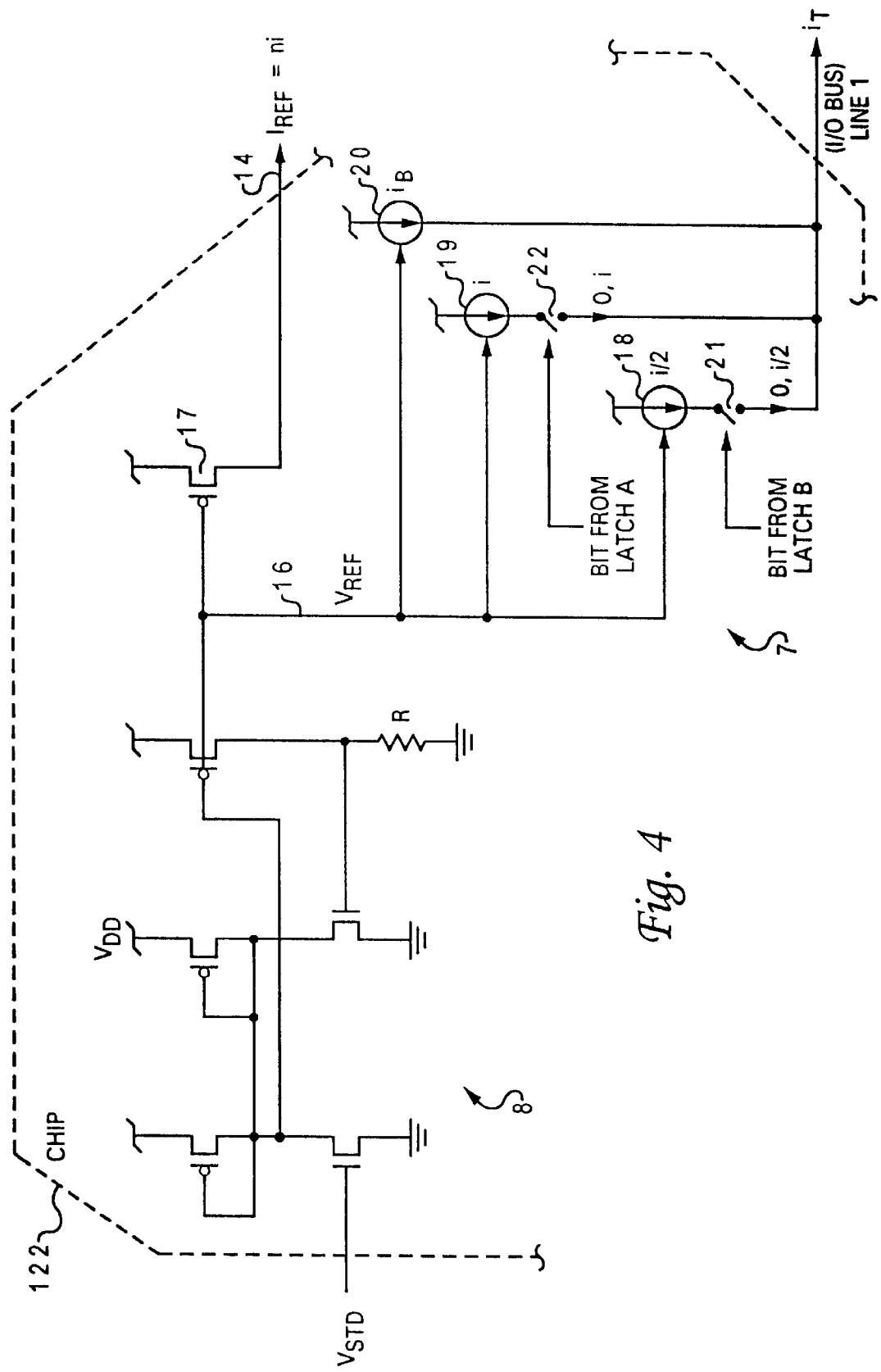
FIG. 4 schematically depicts by electronic devices and functional blocks an embodiment of current source driver 7 and reference generator 8.

Refer now to FIG. 4, which schematically depicts by electronic devices and functional blocks an embodiment of current source driver 7 and reference generator 8. Reference generator 8 utilizes a voltage standard $V_{STD}$, preferably derived off integrated circuit 122, to generate on line 16 of the integrated circuit 122 a reference voltage $V_{REF}$. The voltage $V_{REF}$ is used on integrated circuit 122 to generate accurate incremental values of current I within the context of integrated circuit 122 using current mirror connected and dimensionally refined field-effect transistors. The presence of the common reference current ensures that the signals generated by the current mirror circuits are accurately related; however, it is envisioned that as fabrication accuracy increases, such common reference current may eventually not be needed, in that chip-generated reference voltages should be within tolerance levels (e.g., "$I_{REF}$" 14 would no longer be present, and instead a "$V_{STD}$" source would be input to reference replicator 13 in a manner analogous to the way the "$V_{STD}$" source inputs to reference generator 8). The $V_{REF}$ on line 16 is applied to field-effect transistor 17 to create a current source of fixed value $I_{REF}$, which is also a multiple, mI, nI, (where "m", and "n" are positive values) of generated currents I, for transmission over parallel data bus 110 from integrated circuit 122 to integrated circuit 124 (FIG. 3). The different current magnitudes are derived from transistor size scaling by width/length (W/L) ratios.

FIG. 4 also depicts the current source drivers for line 1 of I/O parallel data bus 110. The current source drivers for line 1 of the bus are composed of switch current source 18 and switch current source 19, for the output of current source 18 is either zero (0) or I/2, in the output of current source 19 is either zero (0) or I, depending on the respective states of switches 21 and 22. When the switches 21 and/or 22 are enabled, the currents generated in sources 18 and 19 responsive to the reference voltage $V_{REF}$ are provided in respective magnitudes of I/2 or I output current. Preferably, the current sources are current mirror connected field effect transistors. The states of switches 21 and 22 are defined by the binary value associated with respective bits B and A, the bits being derived from interface latches 6 (FIG. 3). The line 1 current $i_T$ is the net sum of the two currents generated by current sources 18 and 19, with incremental values as shown in the table of FIG. 3 of 0, I/2, I, or 3I/2. A design may inject the bias current into line 1 to optimize field effect transistor operational locations for the "N times some multiple" to "IN" and "N" to "N times some multiple" conversions as shown at 20 in FIG. 4.

Current source driver 7 uses the reference signal generated by reference generator 8 to perform the "N times some multiple" conversion between parallel digital data input bit pair A and B to "N" parallel digital data output bit, represented by an encoded output current $i_T$. Generator 8 also provides the reference current signal $I_{REF}$ to receiving integrated circuit integrated circuit 124 to ensure an accurate decode of the "N" parallel digital data output an bit signal back into "N times some multiple" format. The decoding is accomplished using the circuit in FIG. 5.

Figure 5:
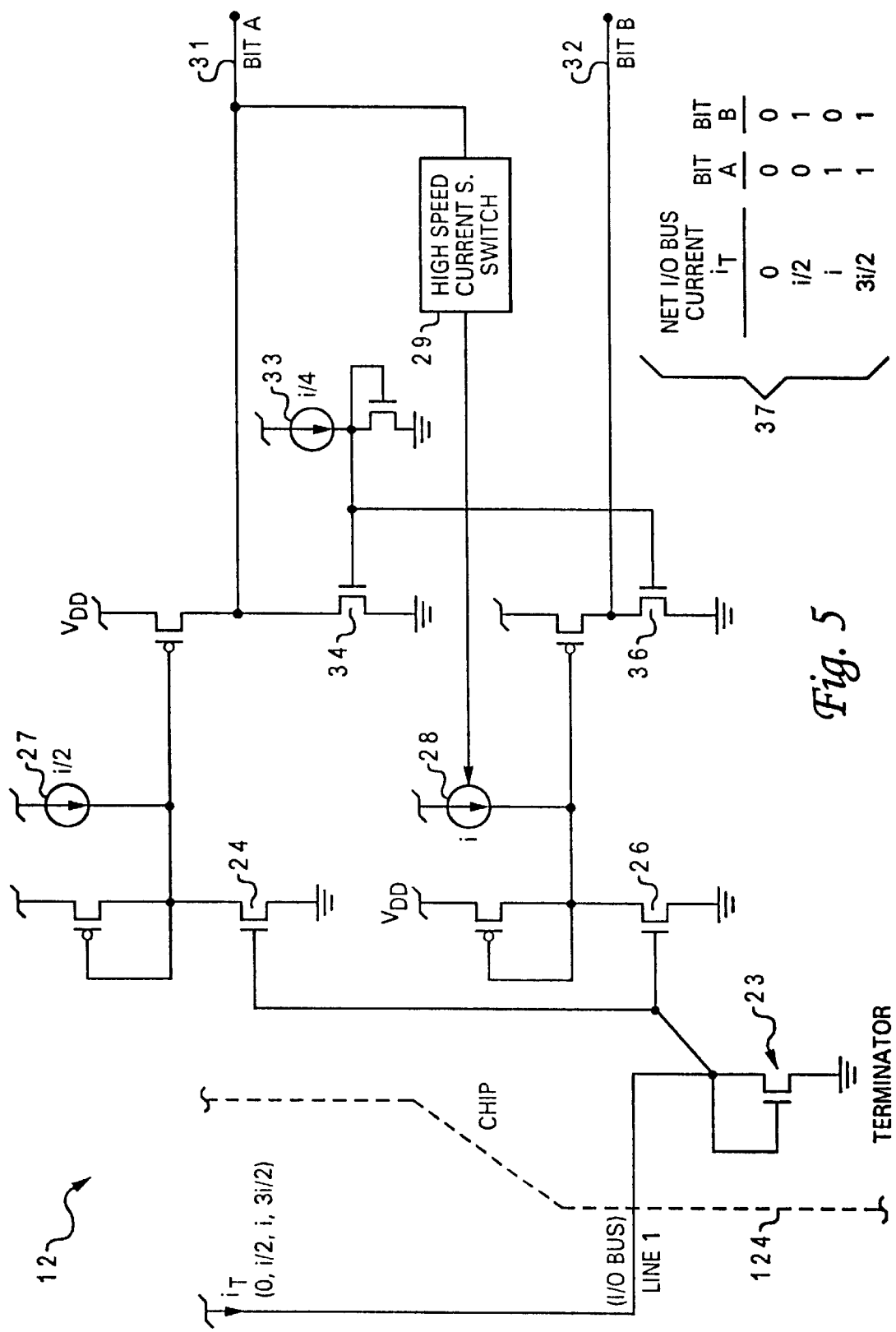
FIG. 5 shows a circuit embodying multilevel converter 12 (FIG. 3)

A circuit embodying multilevel converter 12 (FIG. 3) in shown in FIG. 5. The "N" parallel digital data output bit signal, represented by $i_T$ on line 1 of the I/O bus is sunk by active terminator 23. As noted earlier, the magnitude of the current $i_T$ is 0, I/2, I, or 3I/2, generating respective voltages on the terminator and the mirror connected the electrodes of field transistors 24 and 26. The current drawn by field effect transistors 24 and 26 are compared in separate channels to currents by I/2 and I, generated by current sources 27 and 28. Note that current source 28 is selectively enabled by switch 29 responsive to the binary state of bits A on output line 31. The bit B output on line 32 depends on the current sunk by field effect transistor 26 in relation to the current generated by switched current source 28. Current source 33 provides a bias to center the threshold between the aforementioned levels through the current sinking effects reflected in field effect transistors 34 and 36 as to bits A and B. The table at reference numeral 37 defines the relationships between input current $i_T$ and the binary format values of bits A and B.

Figure 6:
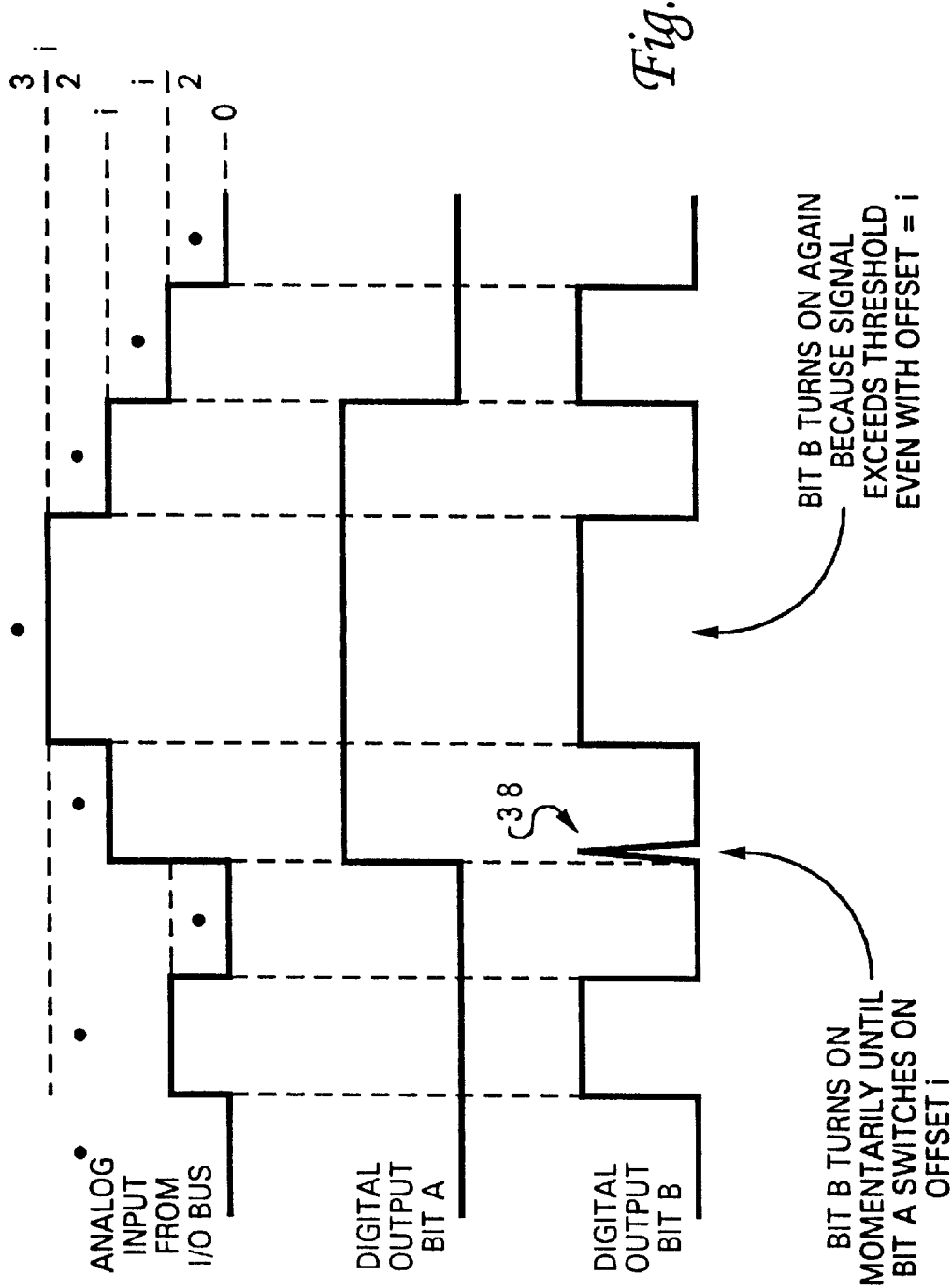
FIG. 6 depicts the relative translations of different analog current levels, from line one the I/O bus, into the binary equivalent represented by the combination bits A and B.

Given that the binary state of bit B on line 32 is affected by the state of bit A on line 31 through the actions of high-speed non-converting current source switch 29 and switched current source 28, there exists a need to ensure that the final state of bit B is resolved as quickly as possible, nominally a small fraction of the clock cycle. As shown by the waveform in FIG. 6, a momentary spike, at reference numeral 38, appears on bit B line 32 until bit A switches on current source 28. FIG. 6 also depicts the relative translations of different analog current levels, from line one the I/O bus, into the binary equivalent represented by the combination bits A and B. The current levels are shown at the right of the first plot in the equivalent digital outputs are depicted through vertically aligned projections of dashed lines.

Figure 7:
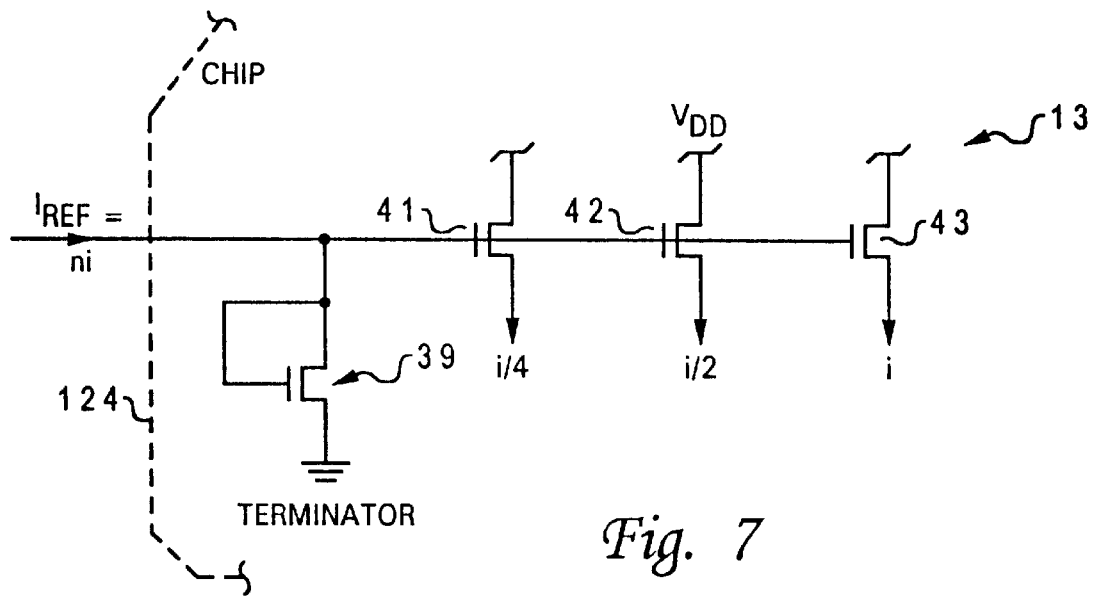
FIG. 7 shows an embodiment of reference replicator 13 (FIG. 3)

An embodiment of reference replicator 13 (FIG. 3) is shown in FIG. 7. Terminator 39, a field effect transistor device, resides on integrated circuit 124, and as such is fabricated at the same time that terminator 23 (FIG. 5) is created. Therefore, the two devices are relatively well matched in their electronic characteristics, as well as being subject to thermal matching conditions. Terminators 23 and 39 can be physically matched to generate corresponding reference voltages when subject to the same currents. When the reference current $I_{REF}$ is established in amount nI, terminator 39 can be connected to multiple current mirror configured field effect transistors 41, 42, in 43 to define successive current flows of I/4, I/2, and I solely by variations in the field effect transistor channel dimensions. The accurately scaled and replicated currents generated by transistors 41, 42, and 43 are current sources 27, 28, and 33 in FIG. 5 as commonly referenced to current "I", both at processor integrated circuit 122 and processor integrated circuit 124. This way, multilevel converter 12 as particularized in FIG. 5 attains precise differentiation for accurate analog traditional conversion in the context of separate integrated circuit chips and potentially differing environmental conditions.

Figure 8:
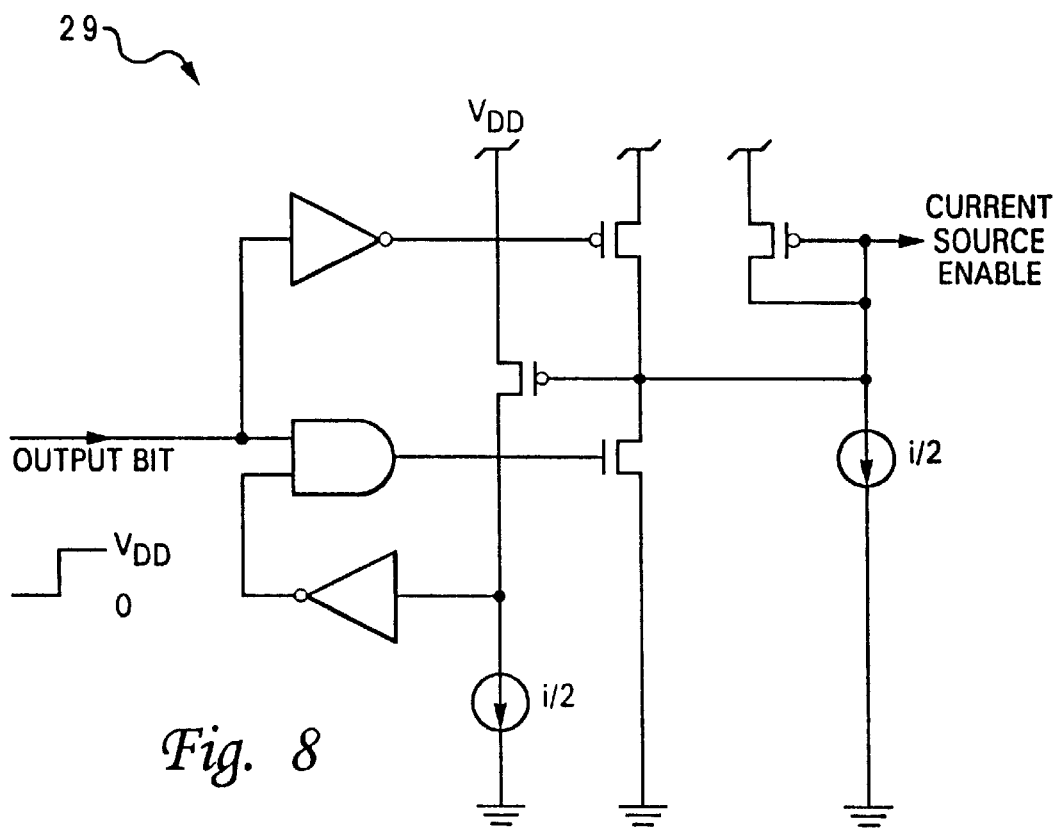
FIG. 8 depicts high-speed current source switched 29 as used to control current source 28 in FIG. 5.

High-speed current source switched 29 as used to control current source 28 in FIG. 5 is detailed in FIG. 8. For the embodiment of FIG. 5, the bit driving high-speed current source switched 29 is bit A, corresponding to line 31 in FIG. 5. The output of switch 29 selectively enables or disables current source 28 and associated current I. The two current sinks used in the embodiment of FIG. 8 are scaled values at the current I to minimize power consumption.

Figure 9:
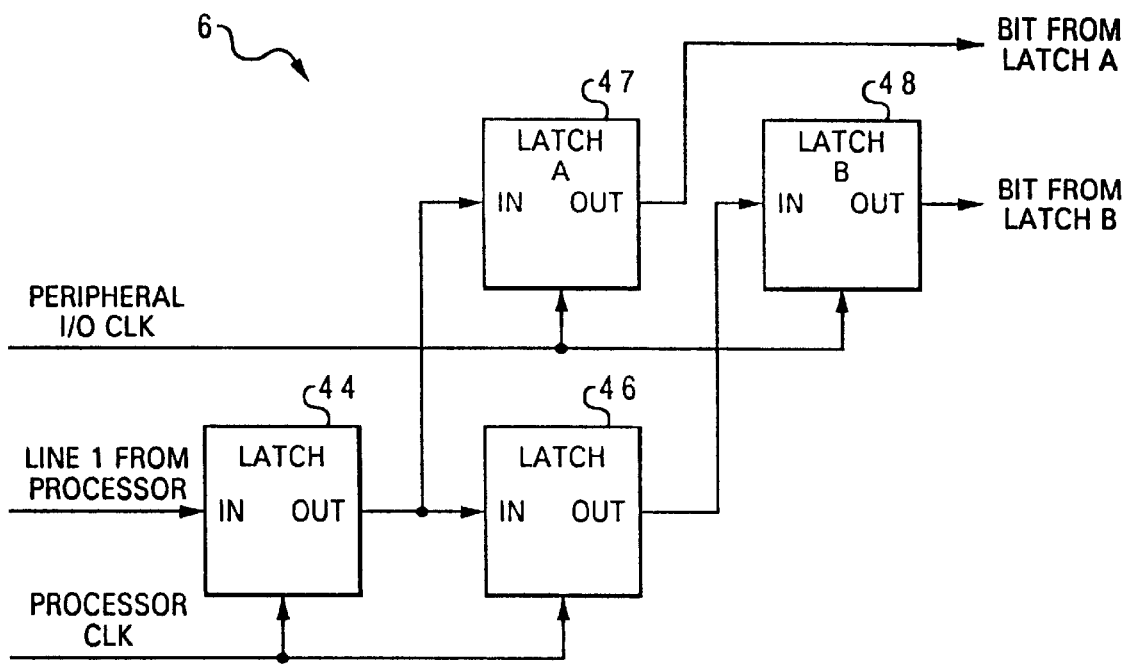
FIG. 9 shows the interface latches in block 6 of FIG. 3.

The interface latches in block 6 of FIG. 3 are shown in the embodiment of FIG. 9. The function, performed individually by bus line, is to receive data from the processor over multiple successive clock cycles, to latch the data, and to provide the combination as input to current source driver 7 for simultaneous "N times some multiple" to "N" conversion, where "N" equates to "one" and "N times some multiple" equates to "two." It can be seen that such devices connected with individual parallel data bus lines would allow virtually unlimited conversion scenarios. As embodied in FIG. 9, line 1 from the processor bus is provided as input to latch 44, whose output is thereupon provided to latch 46 in processor clocked succession. In conjunction, latches 47 into 48 are synchronized to the I/O clock, which in one embodiment operates at half the processor clock speed, to receive the outputs from corresponding latches 44 into 46, and in I/O clocked succession to provide as outputs the data representing bit A and bit B, the bits having been the successive binary values on line 1 from the processor. The bits from latches 47 and 48 to serve as the enabling signals for gates 21 and 22 shown in FIG. 4.

Figure 10:
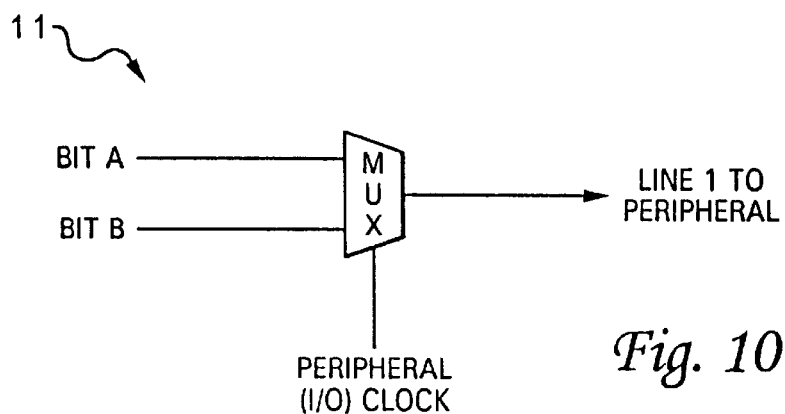
FIG. 10 depicts the electronic circuit for multiplexer 11 as originally shown in FIG. 3.

FIG. 10 depicts the electronic circuit for multiplexer 11 as originally shown in FIG. 3. The multiplexer effectively converts the decoded digital format data from "N" parallel digital data bit signal to "N times some multiple" parallel digital data bit signal format in keeping with the order or originally transmitted from processor circuit element 100 (FIG. 3). Multiplexer 11 is responsive to the I/O clock signal, and in the embodiment of FIG. 10 represents the circuit used for one of all to pull bus lines transmitting data from processor circuit element 100 and processor circuit element 120. The processor clock must be generated in synchronization with I/O clock.

Figure 11:
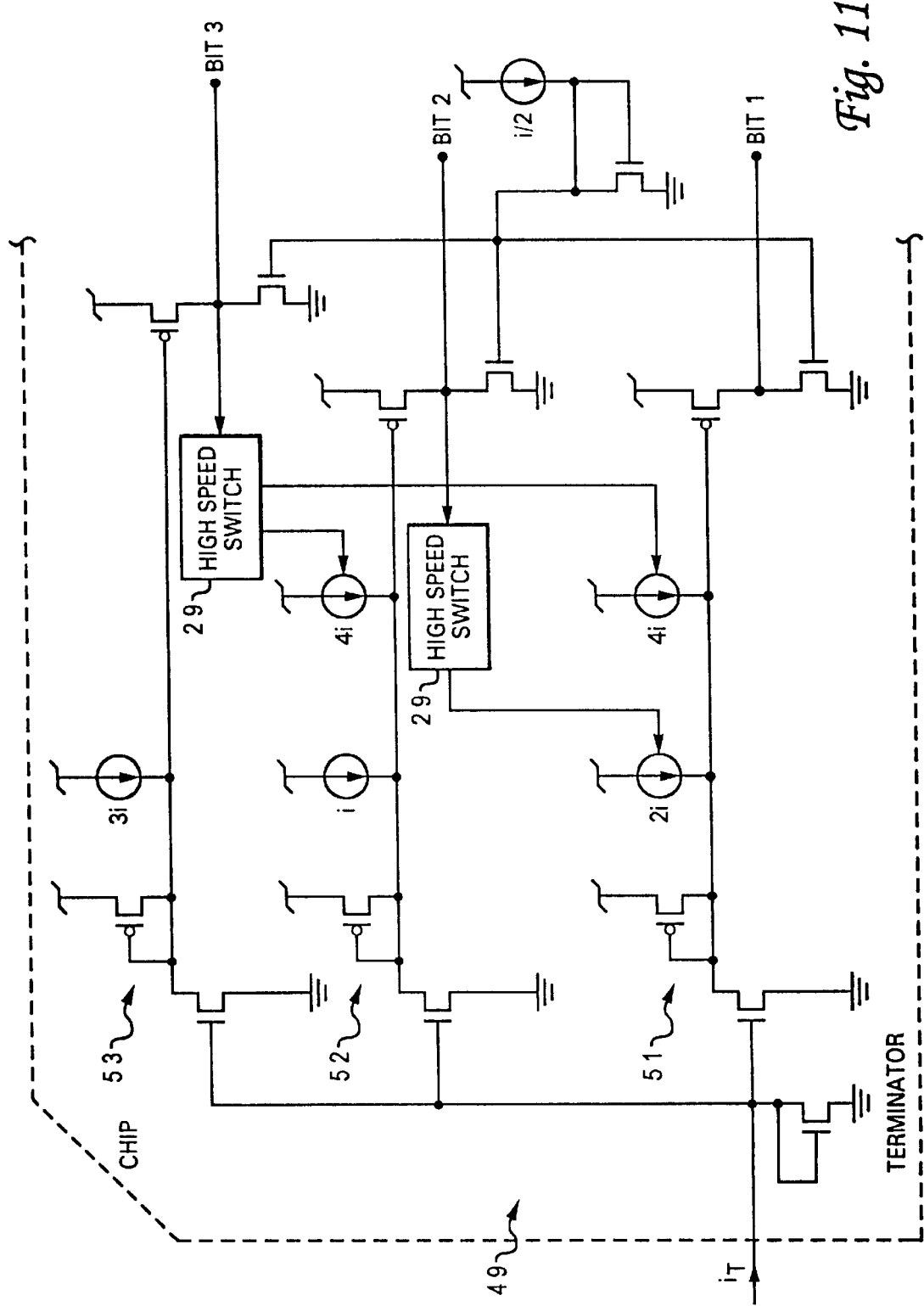
FIG. 11 illustrates an architecture for a three-bit multilevel converter.

Multilevel converter 49 as embodied in FIG. 11 illustrates an architecture for a three-bit multilevel converter. Converter 49 also shows how the basic architecture first described with reference to FIG. 5 may be extended for multiple additional bits through an increase in the number of channels used to perform the comparison, namely, channels 51, 52, and 53, with associated current sources and high-speed switches. The basic architecture is particularly unique and valuable in that the comparisons in the various channels 51, 52, and 53 are performed at substantially the same time, and as such cause converter 49 to operate in a manner analogous to a flash converter. The input current "$i_T$" is a multilevel signal now coded to represent three binary bits, characterized in one of each discrete levels, and by operation of converter 49 generates binary bit equivalents as represented by output bits 1, 2, and 3. The least significant current step shown here is I, where in the previous embodiment the minimum step was I/2. See Table A. The various current sources are created and switched in keeping with the previously described embodiments, where high-speed switch 29 is preferably that depicted in FIG. 8. The fundamental architecture of the embodiment FIG. 11 is expandable to additional bit levels through the use of more channels, and is amenable to decimal magnitudes in selectively switched current sources.

TABLE A

| $i_T$BIT | BIT3 | BIT2 | BIT1 |
|---|---|---|---|
| 0 | 0 | 0 | 0 |
| I | 0 | 0 | 1 |
| 2I | 0 | 1 | 0 |
| 3I | 0 | 1 | 1 |
| 4I | 1 | 0 | 0 |
| 5I | 1 | 0 | 1 |
| 6I | 1 | 1 | 0 |
| 7I | 1 | 1 | 1 |

Figure 12:
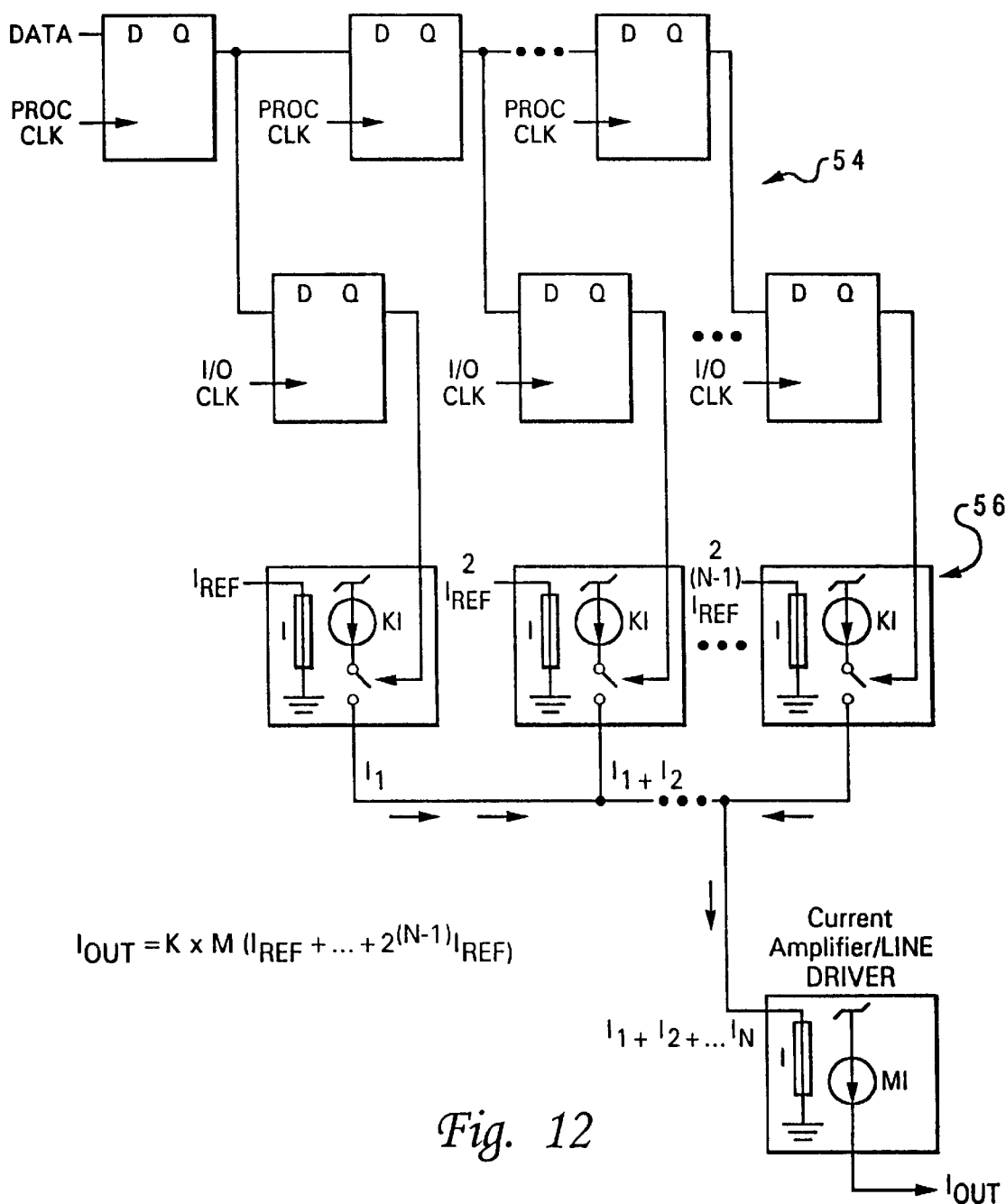
FIG. 12 schematically depicts a generalized architecture for performing the interface latches and current source driver functions ascribed to blocks 6 and 7 in FIG. 3.

FIG. 12 schematically depicts a generalized architecture for performing the interface latches and current source driver functions ascribed to blocks 6 and 7 in FIG. 3 for further levels of analog transmission, whereby additional clock cycles of digital format data are accumulated in the latches at 54, individually converted into currents source signals at 56, and accumulated as a single bit analog current ("$I_{ou}$") for transmission over a line of the data bus.

The invention is particularly valuable in that it defines a system and method which use accurately coded and decoded analog currents to simultaneously transmit over a single line multiple digital bits between separate integrated circuit devices effectively extending the line bandwidth.

It will be understood by those skilled in the art that the embodiments set forth herein are exemplary of the numerous arrangements by which the invention may be practiced, and as such may be replaced by equivalents without departing from the invention, which will be defined in the claims.

What is claimed is:

1. An improved circuit having elements, for use with a parallel data bus of defined width, which provides a parallel data transmission rate which is greater than the defined width of the parallel data bus, said improved circuit comprising:

a width-reduction circuit element having at least two inputs through which are received a first set of parallel digital data signals and having one or more outputs through which are transmitted a second set of parallel digital data signals where the second set is both smaller than the first set and representative of the information contained within the first set and wherein said width-reduction circuit element further comprises a circuit which receives the first set of parallel digital data signals in binary format voltages and transmits the second set of parallel digital data signals in encoded analog format currents.

2. The improved circuit of claim 1, further comprising a parallel connector, operably connected to the one or more one outputs of said width-reduction circuit, sufficient to form an operable connection with the parallel data bus of defined width.

3. The improved circuit of claim 1, wherein said width-reduction circuit element further comprises:

at least two conductors in parallel which function as the at least two inputs of said width-reduction circuit; and at least one conductor which functions as the one or more outputs of said width-reduction circuit.

4. The improved circuit of claim 1, further comprising at least one processing element having at least two parallel digital data signal outputs with said at least two parallel digital data signal outputs operably connected, respectively, to said at least two inputs of said width-reduction circuit element.

5. The improved circuit of claim 4, wherein said width-reduction circuit element further comprises a circuit which receives the first set of parallel digital data signals in the form of voltages and transmits the second set of parallel digital data signals in the form of currents.

6. The improved circuit of claim 5, wherein said width-reduction circuit element further comprises:

at least two conductors in parallel which function as the at least two inputs of said width-reduction circuit; and at least one conductor which functions as the one or more outputs of said width-reduction circuit.

7. An improved circuit having elements, for use with a parallel data bus of defined width, which provides a parallel data transmission rate which is greater than the defined width of the parallel data bus, said improved circuit comprising:

a width-expansion circuit element having one or more inputs through which are received a second set of parallel digital data signals, wherein said width-expansion circuit element further comprises a circuit which receives the second set of parallel digital data signals in encoded analog format currents and transmits the first set of parallel digital data signals in binary format voltages and having at least two outputs through which are transmitted a first set of parallel digital data signals where the first set is both larger than the second set and representative of information encoded within the second set.

8. The improved circuit of claim 7, further comprising a parallel connector, operably connected to the one or more inputs of said width-expansion circuit, sufficient to form an operable connection with the parallel data bus of defined width.

9. The improved circuit of claim 7, wherein said width-expansion circuit element further comprises:

at least one conductor which functions as the one or more inputs of said width-expansion circuit; and at least two conductors in parallel which function as the at least two outputs of said width-expansion circuit.

10. The improved circuit of claim 7, further comprising at least one processing element having at least two parallel digital data signal inputs with said at least two parallel digital data signal inputs operably connected, respectively, to said at least two outputs of said width-expansion circuit element.

11. The improved circuit of claim 10, wherein said width-expansion circuit element further comprises a circuit which receives the second set of parallel digital data signals in the form of currents and transmits the first set of parallel digital data signals in the form of voltages.

12. The improved circuit of claim 11, wherein said width-expansion circuit element further comprises:

at least one conductor which functions as the one or more inputs of said width-expansion circuit; and at least two conductors in parallel which function as the at least two outputs of said width-expansion circuit.

13. A method, for use with an integrated circuit transmitting digital data over a parallel data bus of defined width, which increases the integrated circuit's parallel digital data transmission rate without increasing the width of the parallel data bus of defined width, said method comprising the steps of:

receiving a first set of parallel digital data signals; and transmitting, via the parallel digital data bus of defined width, a second set of parallel digital data signals where the second set is both smaller than the first set and is representative of the information contained within the first set and is comprised of a predefined set of carrying current amplitudes where each amplitude represents an encoded combination of input signals.

14. The method of claim 13, wherein said step of receiving further includes the step of receiving at least two parallel digital data signals from at least one processing element.

15. The method of claim 13, wherein said step transmitting further includes the step of transmitting one or more parallel digital data signals.

16. The method of claim 13, wherein said step of receiving further comprises receiving the first set of parallel digital data signals in the form of voltages and wherein said step of transmitting further comprises transmitting the second set of parallel digital data signals in the form of currents.

17. A method, for use with an integrated circuit transmitting digital data over a parallel data bus of defined width, which increases the integrated circuit's parallel digital data reception rate without increasing the width of the parallel data bus of defined width, said method comprising the steps of:

receiving, via the parallel digital data bus of defined width, a second set of parallel digital data signals comprised of a predefined set of carrying current amplitudes where each amplitude represents an encoded combination of input signals; and transmitting a first set of parallel digital data signals where the first set is both larger than the second set and is representative of the information encoded within the second set.

18. The method of claim 17, wherein said step of transmitting further includes the step of transmitting at least two parallel digital data signals to at least one processing element.

19. The method of claim 17, wherein said step of receiving further includes the step of receiving one or more parallel digital data signals.

20. The method of claim 17, wherein said step of receiving further comprises receiving the second set of parallel digital data signals in the form of currents and wherein said step transmitting further comprises transmitting the first set of parallel digital data signals in the form of voltages.

* * * * *

UNITED STATES PATENT AND TRADEMARK OFFICE
CERTIFICATE OF CORRECTION

PATENT NO.   : 6,101,561
DATED        : August 8, 2000
INVENTOR(S)  : Beers, et al.

Page 1 of 1

It is certified that error appears in the above-identified patent and that said Letters Patent is hereby corrected as shown below:

<u>Column 7:</u>
Line 23, please delete "IN" and insert --N--.

<u>Column 9:</u>
Line 41, please delete "$_{ou}$" and insert --$_{out}$--.

Signed and Sealed this

Twelfth Day of June, 2001

*Nicholas P. Godici*

Attest:

NICHOLAS P. GODICI
*Acting Director of the United States Patent and Trademark Office*

*Attesting Officer*